United States Patent
Kamata et al.

(10) Patent No.: US 9,489,348 B2
(45) Date of Patent: Nov. 8, 2016

(54) SCREEN GENERATING METHOD, IMAGE FORMING APPARATUS, AND COMPUTER PROGRAM PRODUCT

(71) Applicants: Takehiro Kamata, Saitama (JP); Atsuko Yagi, Kanagawa (JP)

(72) Inventors: Takehiro Kamata, Saitama (JP); Atsuko Yagi, Kanagawa (JP)

(73) Assignee: Ricoh Company, Limited, Tokyo (JP)

( * ) Notice: Subject to any disclaimer, the term of this patent is extended or adjusted under 35 U.S.C. 154(b) by 763 days.

(21) Appl. No.: 13/891,910

(22) Filed: May 10, 2013

(65) Prior Publication Data
US 2013/0254641 A1    Sep. 26, 2013

Related U.S. Application Data

(63) Continuation of application No. 12/216,836, filed on Jul. 11, 2008, now Pat. No. 8,468,213.

(30) Foreign Application Priority Data

Jul. 13, 2007 (JP) .................................. 2007-185056
Jun. 16, 2008 (JP) .................................. 2008-157156

(51) Int. Cl.
    *G06F 17/00*       (2006.01)
    *G06F 17/21*       (2006.01)
    (Continued)

(52) U.S. Cl.
CPC ........ *G06F 17/212* (2013.01); *H04N 1/00222* (2013.01); *H04N 1/00225* (2013.01); *H04N 1/00244* (2013.01); *H04N 1/00413* (2013.01); *H04N 1/00472* (2013.01); *H04N 1/00477* (2013.01); *H04N 1/00482* (2013.01); *H04N 1/32101* (2013.01); *H04N 2201/0015* (2013.01);
(Continued)

(58) Field of Classification Search
CPC ........................... G06F 17/212; G06F 17/211
USPC ........................................................ 715/202
See application file for complete search history.

(56) References Cited

U.S. PATENT DOCUMENTS

5,604,860 A * 2/1997 McLaughlin ......... G06F 3/0483
                                                       715/810
6,591,272 B1 * 7/2003 Williams .......... G06F 17/30607
(Continued)

FOREIGN PATENT DOCUMENTS

EP           1758364 A2    2/2007
JP       2003-032425 A    1/2003
(Continued)

OTHER PUBLICATIONS

Andrea Marchetti et al.: "Xflow: An XML-Based Document-Centric Workflow", Web Information Systems Engineering—Wise 2005 Lecture Notes in Computer Science; LNCS, Springer, Berlin, Germany, vol. 3806, Jan. 1, 2005, pp. 290-303.

*Primary Examiner* — Laurie Ries
(74) *Attorney, Agent, or Firm* — Harness, Dickey & Pierce, P.L.C.

(57) ABSTRACT

A screen generating method is implemented on a distribution managing system in which an image forming apparatus, a managing server, and a client device are connected. In the screen generating method, the client device receives input for designating an item for setting metadata on a generating screen; generates definition data of an input screen on which the metadata is set based on a descriptor that is arbitrary determined by a user for displaying the item on the input screen and the item designated on the generating screen; and transmits the definition data to the image forming apparatus.

16 Claims, 26 Drawing Sheets

(51) Int. Cl.
*H04N 1/00* (2006.01)
*H04N 1/32* (2006.01)

(52) U.S. Cl.
CPC ............. *H04N 2201/0074* (2013.01); *H04N 2201/0094* (2013.01)

(56) References Cited

U.S. PATENT DOCUMENTS

| | | | |
|---|---|---|---|
| 7,039,861 | B2 | 5/2006 | Yagi |
| 7,110,664 | B2 * | 9/2006 | Yogeshwar ............. H04N 5/76 386/328 |
| 7,185,007 | B2 | 2/2007 | Yagi |
| 7,747,983 | B2 | 6/2010 | DeBruin et al. |
| 7,949,206 | B2 | 5/2011 | Itogawa et al. |
| 8,078,975 | B2 | 12/2011 | Sprague et al. |
| 8,108,830 | B2 | 1/2012 | Bibr et al. |
| 2003/0011633 | A1 | 1/2003 | Conley et al. |
| 2004/0003268 | A1 * | 1/2004 | Bourne ................. G06F 21/10 713/193 |
| 2004/0047606 | A1 | 3/2004 | Mikawa |
| 2004/0070613 | A1 * | 4/2004 | Sprague ............ G06F 17/3089 715/762 |
| 2005/0024355 | A1 | 2/2005 | Yagi |
| 2005/0041860 | A1 | 2/2005 | Jager |
| 2005/0174603 | A1 | 8/2005 | Iinuma et al. |
| 2006/0041896 | A1 | 2/2006 | Yagi |
| 2006/0055965 | A1 | 3/2006 | Nakamura et al. |
| 2006/0092097 | A1 | 5/2006 | Reddy et al. |
| 2006/0098221 | A1 | 5/2006 | Ferlitsch |
| 2006/0132825 | A1 * | 6/2006 | Czudak ................ G06F 3/121 358/1.15 |
| 2006/0277160 | A1 * | 12/2006 | Singh ............. G06F 17/30126 |
| 2007/0214185 | A1 * | 9/2007 | Fujiwara ......... G06F 17/30011 |
| 2007/0217678 | A1 | 9/2007 | Kato |
| 2007/0285524 | A1 | 12/2007 | Murata |
| 2007/0288480 | A1 * | 12/2007 | Caplan ............ G06F 17/30867 |
| 2008/0068638 | A1 | 3/2008 | Yagi |
| 2008/0154926 | A1 | 6/2008 | Newman |
| 2008/0226260 | A1 | 9/2008 | Yang et al. |
| 2008/0270911 | A1 * | 10/2008 | Dantwala ............... G06Q 10/10 715/741 |

FOREIGN PATENT DOCUMENTS

| | | |
|---|---|---|
| JP | 2004-171199 A | 6/2004 |
| JP | 2005-208934 A | 8/2005 |
| JP | 2006-203283 A | 8/2006 |

* cited by examiner

FIG. 2

| METADATA | | LOGOUT | NEXT |
|---|---|---|---|
| INPUT OR SELECT METADATA. | | | |

| INPUT TEXT | |
|---|---|
| NUMBER SELECTION BOX | 0 ↓ ↑ |
| DATE COLUMN | 2008/04/07 |
| DROP-DOWN LIST | XXX ▼ |
| CHECK BOX | ☐ |

| DOCUMENT NAME | |
|---|---|
| SCAN SETTING | |

SYSTEM STATE | JOB LIST | 04/07/2008 21:40

110

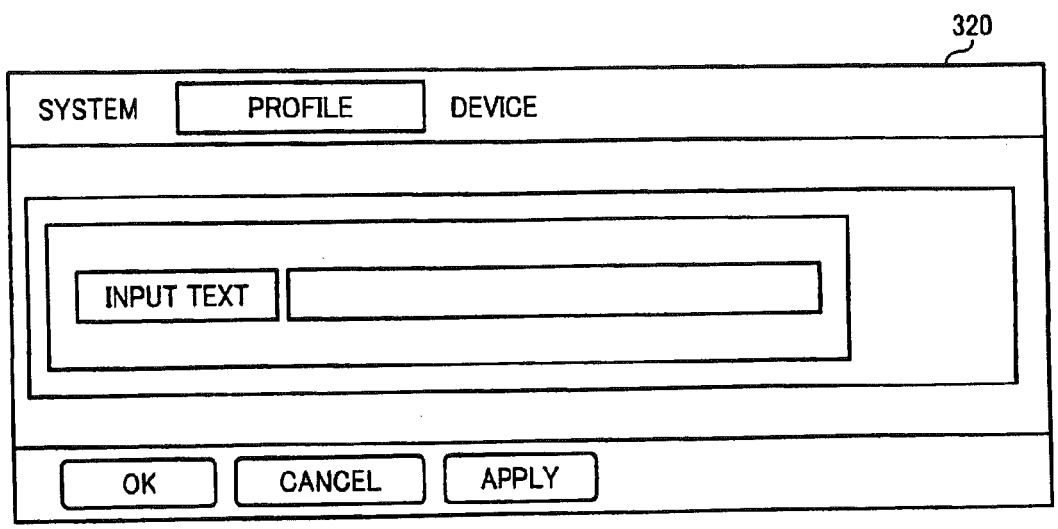

```
<docName>document</docName>
<date>20080407</date>
<property name="input1" type="text">aaa</property>
```

```
<distribution>
  <id>folder</id>
  <parameters>
    <ip-address>XXX.XXX.XXX.XXX</ip-address>
    <folder>c\targetfolder</folder>
    <file-name type="opepane"><property><date>
  </parameters>
<distribution>
```

```
<prop>
  <form/name="input1"/type="text"/propTagName="myDocumentTitle"/>
  </form>
</prop>
                                                          T1
```

```
<docName>document</docName>
<date>20080407</date>
<myDocumentTitle>aaa</myDocumentTitle>
      T1                        T1
```

```
<prop>
  <form name="input1" type="text">
    <displayName>DESCRIPTION</displayName>
  </form>              T2
</prop>
```

FIG. 16

METADATA
INPUT OR SELECT METADATA.                    [LOGOUT] [NEXT]    110

DESCRIPTION
T2

DOCUMENT NAME
SCAN SETTING

[SYSTEM STATE] [JOB LIST]    04/07/2008 21:53

FIG. 17

```
<prop>
  <form name="input1" type="text">
    <displayName>
      <english>DESCRIPTION</english>   T2
      <japanese>DESCRIPTION</japanese>
    </displayName>                     T3
  </form>
</prop>
```

INPUT TEXT

GENERAL SETTING

VALID ⊙ YES ○ NO
REQUIRED ENTRY ITEM ○ YES ⊙ NO
DISPLAY NAME [DESCRIPTION]
TAG NAME ON METADATA XML* [txt]

INPUT TEXT

MAXIMUM CHARACTERS [128]
MINIMUM CHARACTERS [0]
PASSWORD ○ YES ⊙ NO
REGEX FOR VALIDATION [          ]

[OK] [CANCEL]

FIG. 23

| METADATA | | LOGOUT | NEXT |
|---|---|---|---|
| INPUT OR SELECT METADATA. | | | |

DESCRIPTION
T3

DOCUMENT NAME
SCAN SETTING

SYSTEM STATE | JOB LIST | 04/07/2008 22:08

110

FIG. 24
```
<prop>
  <form name="input1" type="text" value="XYZ CORPORATION">
  </form>                                       T4
</prop>
```
FIG. 25
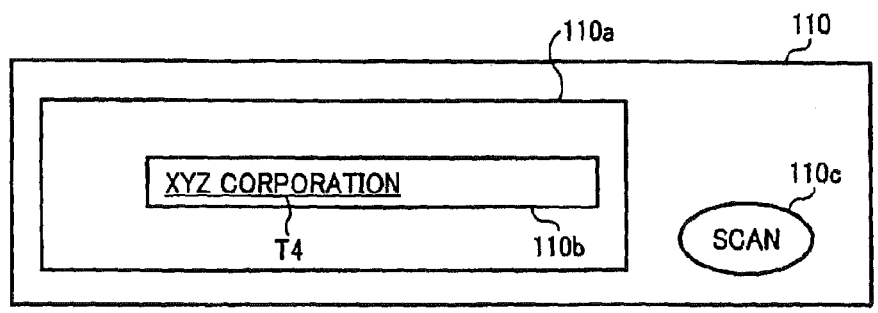
FIG. 26
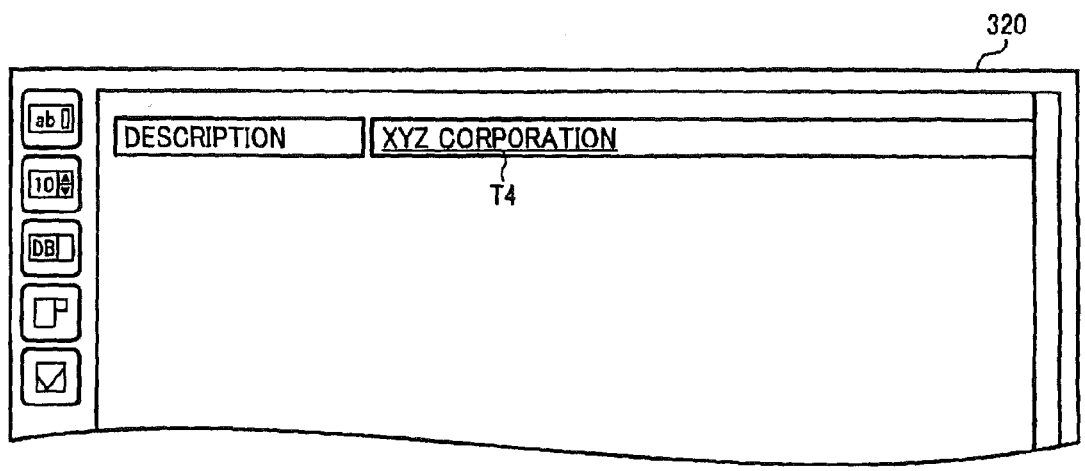

FIG. 27

METADATA
INPUT OR SELECT METADATA

[LOGOUT] [NEXT]   110

| DESCRIPTION | XYZ CORPORATION |

T4

| DOCUMENT NAME | |
| SCAN SETTING | |

[SYSTEM STATE] [JOB LIST]   04/07/2008 22:21

FIG. 28

```
<prop>
  <form name="input1" type="select">      T5
    <option>REQUIREMENT DEFINITION</option>
    <option>BASIC DESIGN</option>       T5b   T5a
    <option>DETAIL DESIGN</option>
                                         T5c
  </form>
</prop>
```

FIG. 32

| METADATA | | LOGOUT | NEXT |
|---|---|---|---|
| INPUT OR SELECT METADATA. | | | |

OBJECT NAME | REQUIREMENT DEFINITION ▼
T5

DOCUMENT NAME
SCAN SETTING

SYSTEM STATE | JOB LIST | 04/07/2008 22:38

FIG. 33

METADATA — LOGOUT | NEXT
INPUT OR SELECT METADATA.

OBJECT NAME | REQUIREMENT DEFINITION ▼
- T5a — REQUIREMENT DEFINITION ▲
- T5b — BASIC DESIGN
- T5c — DETAIL DESIGN

DOCUMENT NAME
SCAN SETTING

SYSTEM STATE | JOB LIST | 04/07/2008 22:40

```
<prop>
  <form name="input1" type="radio">   T6
    <option icon="./iconA.bmp">REQUIREMENT DEFINITION</option>
    <option icon="./iconB.bmp">BASIC DESIGN</option>   T6b
    <option icon="./iconC.bmp">DETAIL DESIGN</option>  T6a
  </form>                                              T6c
</prop>
```

```
<prop>
  <form name="input1" type="password">
  </form>
</prop>
              T7
```

FIG. 39

METADATA
INPUT OR SELECT METADATA.                    LOGOUT   NEXT

PASSWORD    *******
            T7

DOCUMENT NAME
SCAN SETTING

SYSTEM   JOB LIST   04/07/2008
                          STATE                 22:55

FIG. 40

```
<prop>
 <form name="input1" type="text">
  <check>* SPECIFICATION</check>
 </form>                           T8
</prop>
```

SCREEN GENERATING METHOD, IMAGE FORMING APPARATUS, AND COMPUTER PROGRAM PRODUCT

CROSS-REFERENCE TO RELATED APPLICATIONS

This application is a continuation application of U.S. application Ser. No. 12/216,836, filed Jul. 11, 2008, which claims priority under U.S.C. §119 to Japanese priority document 2007-185056, filed on Jul. 13, 2007 and Japanese priority document 2008-157156 filed on Jun. 16, 2008.

BACKGROUND OF THE INVENTION

1. Field of the Invention

The present invention relates to a screen generating method, an image forming apparatus, and a computer program product.

2. Description of the Related Art

Recently, as an image input/output apparatus that computerizes a paper document into image data by scanning the paper document and outputs the image data, even a single-function device such as a scanner has a function of transmitting image data obtained by scanning (hereinafter, "scan data") to an external device such as a personal computer (PC) and a printer for use therein via a network as well as a multi-function peripheral (MFP) having multifunction that includes a copier as a base.

The system utilizing the scan data via the network shares a scanner by external devices, so that a method is employed in which the scan data is managed by a managing server for enhancing efficiency of the system.

The managing server is generally installed independently on the network. However, for example, when an image is scanned to be utilized in a device itself for outputting such as the MFP, a managing server function is provided in the MFP as one function, which enables the MFP to also receive access from the external devices.

The managing server or the managing server function (hereinafter, "managing server") has a function as a distribution managing server that stores and manages the scan data at the time of a scanning request and distributes the scan data at the time of the scanning request or thereafter in response to a request from the external device for reuse of the data.

Conventional scan data distribution managing systems having the distribution managing server function are disclosed in Japanese Patent Application Laid-open No. 2003-032425, Japanese Patent Application Laid-open No. 2004-171199, and Japanese Patent Application Laid-open No. 2005-208934.

A distribution system for scan image data in Japanese Patent Application Laid-open No. 2003-032425 relates to a system for managing distribution of digital image data obtained by a scanner by a remote server. FIG. 45 is schematic diagram of the distribution system. The remote server has a function of managing charging for the use of the system. As shown in FIG. 45, an original is scanned by a scanner connected to a network to obtain image data, and the image data is transferred to the remote server via the network to be stored and managed therein. In response to a request for downloading from a PC via the network, the remote server distributes digital image data under management to the PC in accordance with the instruction.

A document management system in Japanese Patent Application Laid-open No. 2004-171199 introduces an automatic distributing function for simplifying a user operation at the time of storing scan input documents into a specified folder and properly managing the documents. FIG. 46 is a schematic diagram of the document management system. As shown in FIG. 46, at the time of using the automatic distributing function, a user selects a distribution destination automatically selecting folder as a distribution destination and operates a scanner to input an original document. The document image file that is input is temporarily stored in the distribution destination automatically selecting folder via a distribution processing unit. The stored image is provided with distribution destination folder information as text data on a specific area of the document. An optical character recognition (OCR) processing unit recognizes the information and resends the image data file to the distribution processing unit to redistribute it to a distribution destination folder.

A document distribution processing device in Japanese Patent Application Laid-open No. 2005-208934 relates to a device that, at the time of reading and distributing a document, makes it easy to automatically execute necessary image processes. FIG. 47 is a schematic diagram of the document distribution processing device. As shown in FIG. 47, an OCR form sheet is positioned at the front page of a document. Code data corresponding to an image processing menu written on the OCR form sheet and image processing position data specifying an image processing area are recognized and extracted from document data obtained by scanning the document with a scanner. The image process that matches the extracted code data is executed in the area specified by the image processing position data. Then, the document data on which the specified image process is executed is distributed to a distribution destination corresponding to the code data.

In the conventional managing function of a document that is scanned and input such as the above described conventional technologies, when a document to be stored and managed in a server or a database is scanned and input, managing information such as a file name is normally added to the input document on a system side in accordance with a predetermined rule and the document is temporarily stored and managed in the server or the database. In other words, no information is added to the document to be managed for a user to associate the document with the distribution at the time of scanning.

Therefore, when the user distributes a document under management of the server or the database, the user opens a folder in the server or the like and inputs distribution associated information used at the time of distribution to add it to the document, thereby setting metadata to the data file again. The metadata represents various pieces of information for identifying a data file generated from the document such as a name of the data file, an attribute of the data file, and a presence/absence of a setting of authority such as reference and writing in addition to the distribution associated information (e.g., a company name of a transmission destination) that is used at the time of distributing the document. It is complicated to repeat setting such metadata on the managing server every time a scanned document is distributed. Particularly, when distributing a document to a plurality of distribution destinations, a workload on a user is increased. Thus, the conventional managing function is not convenient enough for a user.

SUMMARY OF THE INVENTION

It is an object of the present invention to at least partially solve the problems in the conventional technology.

According to an aspect of the present invention, there is provided a screen generating method that is implemented on a distribution managing system in which an image forming apparatus that transmits metadata set for an input document and image data generated from the input document to a managing server that manages distribution of the image data, the managing server, and a client device that includes an input receiving unit, a definition generating unit, a communication unit, and a display unit that displays a generating screen for generating an input screen on which the metadata is set are connected via a communication network. In the screen generating method, the input receiving unit of the client device receives input for designating an item for setting the metadata on the generating screen; the definition generating unit of the client device generates definition data on the input screen based on a descriptor that is arbitrary determined by a user for displaying the item on the input screen and the item designated on the generating screen; and the communication unit of the client device transmits the definition data to the image forming apparatus.

According to another aspect of the present invention, there is provided a computer program product comprising a computer usable medium having computer readable program codes embodied in the medium that, when executed, causes a computer to execute the above screen generating method.

According to still another aspect of the present invention, there is provided an image forming apparatus that is connected to a managing server that manages distribution of image data and a client device that generates definition data on an input screen for setting metadata on the image data. The image forming apparatus including a generating unit that generates the image data from an input document; a receiving unit that displays the input screen in accordance with the definition data received from the client device and receives input of the metadata from the input screen; and a communication unit that receives the definition data generated in the client device and transmits the metadata and the image data to the managing server.

The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIG. 2 is a schematic diagram illustrating an example of a metadata input screen displayed on an operation panel of a multi-function peripheral (MFP) shown in FIG. 1;

FIG. 4 is a schematic diagram illustrating an example of a simplified screen-definition-data generating screen;

FIG. 5 is a schematic diagram illustrating an example of screen definition data in XML format generated from the screen-definition-data generating screen shown in FIG. 4;

FIG. 16 is a schematic diagram illustrating an example of the metadata input screen displayed on the display unit based on the screen definition data generated from the screen-definition-data generating screen shown in FIG. 14;

FIG. 17 is a schematic diagram illustrating an example of the screen definition data in XML format generated in a third modified example;

FIG. 22 is a schematic diagram illustrating an example of the attribute display screen (after change) of the screen-definition-data generating screen shown in FIG. 19;

FIG. 23 is a schematic diagram illustrating an example of the metadata input screen displayed on the display unit in a language (Japanese) set on the attribute display screen shown in FIG. 22;

FIG. 24 is a schematic diagram illustrating an example of the screen definition data in XML format generated in a fourth modified example;

FIG. 25 is a schematic diagram illustrating an example of the metadata input screen displayed on the display unit based on the screen definition data shown in FIG. 24;

FIG. 26 is a schematic diagram illustrating a specific example of the screen-definition-data generating screen for generating the metadata input screen shown in FIG. 25;

FIG. 27 is a schematic diagram illustrating more specific example of the metadata input screen shown in FIG. 25;

FIG. 28 is a schematic diagram illustrating an example of the screen definition data in XML format generated in a fifth modified example;

FIG. 32 is a schematic diagram illustrating more specific example of the metadata input screen displayed on the display unit based on the screen definition data shown in FIG. 29;

FIG. 33 is a schematic diagram illustrating an example of the metadata input screen shown in FIG. 32 on which a pull-down menu is displayed;

FIG. 39 is a schematic diagram illustrating an example of the metadata input screen displayed on the display unit based on a definition set on the attribute display screen shown in FIG. 38;

FIG. 40 is a schematic diagram illustrating an example of the screen definition data in XML format generated in an eighth modified example;

DETAILED DESCRIPTION OF THE PREFERRED EMBODIMENTS

Exemplary embodiments of the present invention are explained below with reference to the accompanying drawings.

In the embodiments explained below, an MFP that includes a printer function, a scanner function, a copier function, and a facsimile function is used as an image forming apparatus to which image data is input; however, any type of apparatus capable of inputting image data such as a scanner, a facsimile, and a copier can be used.

Figure 1:
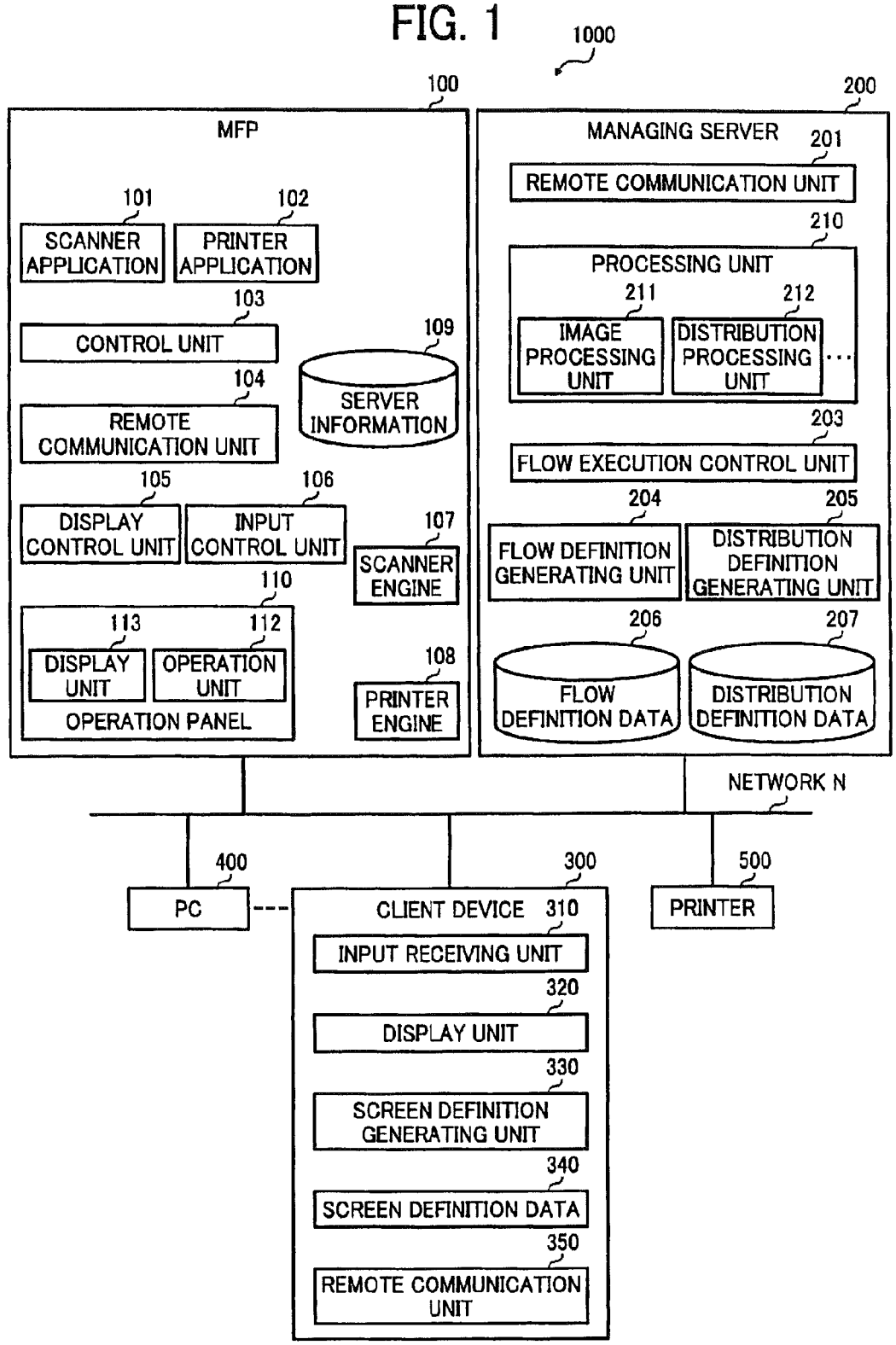
FIG. 1 is a block diagram of a configuration of a distribution managing system according to an embodiment of the present invention.

FIG. 1 is a block diagram of a network configuration of a distribution managing system 1000 according to an embodiment of the present invention. The distribution managing system 1000 includes an MFP 100, a managing server 200, a client device 300, a personal computer (PC) 400, a printer 500, and a network N.

The MFP 100 has various functions of a scanner, a copier, a printer, a facsimile, and the like. The MFP 100 scans a sheet such as paper by using the scanner function to generate image data and transmits the generated image data to the managing server 200.

As shown in FIG. 1, the MFP 100 includes a scanner application 101, a printer application 102, a control unit 103, a remote communication unit 104, a display control unit 105, an input control unit 106, an operation panel 110, a scanner engine 107, a printer engine 108, and a server information 109.

The server information 109 is a database in which an internet protocol (IP) address and the like of the managing server 200 are registered, and is stored in a storage medium such as a hard disk drive (HDD) and a memory.

The scanner engine 107 executes a scanning operation, and the printer engine 108 executes a printing operation. A user performs an input operation via various screens on the operation panel 110. The operation panel 110 includes a display unit 113 capable of displaying various screens and an operation unit 112 such as a start button, a stop button, a copy button, and a scan button.

The control unit 103 receives a request from an application such as the scanner application 101 and the printer application 102, and controls the scanner engine 107, the printer engine 108, the HDD, the memory, and the like.

The remote communication unit 104 controls reception and transmission of various data to and from the managing server 200. Specifically, the remote communication unit 104 transmits metadata input from the operation panel 110 and scanned image data to the managing server 200 with the IP address registered in the server information 109. Moreover, the remote communication unit 104 receives from the client device 300 a screen definition data 340 defining a screen for inputting metadata from the operation panel 110. Furthermore, the remote communication unit 104 transmits to the managing server 200 data in the XML format converted from an input value of metadata input from a metadata input screen that is displayed based on the received screen definition data 340.

The display control unit 105 controls the display unit 113 to display various screens, a software keyboard screen, and the like that enable a user to input information by touching them. Specifically, when the display control unit 105 detects that the input control unit 106 receives a scanning operation or the like from a user via the operation unit 112, the display control unit 105 determines whether the remote communication unit 104 has received the screen definition data 340 from the client device 300. When the display control unit 105 determines that the remote communication unit 104 has received the screen definition data 340, the display control unit 105 executes the screen definition data 340 in the XML format to display the metadata input screen on the display unit 113.

FIG. 2 is a schematic diagram illustrating an example in which the display control unit 105 causes the display unit 113 to display the screen definition data 340 received from the client device 300. As shown in FIG. 2, a content of the screen definition data 340 generated in the client device 300 is displayed on the display unit 113. The content of the screen definition data 340 includes items for inputting various pieces of metadata such as an input text box for inputting a document name and a drop-down list for selecting a transmission destination. As shown in FIG. 2, preset initial values are displayed on the drop-down list and the like of the display unit 113.

The input control unit 106 is a unit for receiving an input, such as data or commands, from a user and controlling the input. More specifically, the input control unit 106 receives input from the display unit 113 and/or the operation unit 112. For this purpose, the display unit 113 is provided with a touch screen and/or a software keyboard. Specifically, when the input control unit 106 detects an input event, such as a touch to the touch screen on the display unit 113 or pressing of a button of the operation unit 112, the input control unit 106 notifies occurrence of the input event to the scanner application 101.

The input control unit 106 receives an input value of the metadata input from the metadata input screen and converts the input value into data in the XML format. Moreover, when the input control unit 106 detects an input by a user touching a screen or pressing a button, the input control unit 106 instructs the display control unit 105 to execute the screen definition data 340 received by the remote communication unit 104 to display the metadata input screen on the display unit 113.

The scanner application 101 is an application for executing a setting of a scanning condition or a scanning process in response to the instruction from a user via the operation unit 112 (a scan button or the like). Specifically, the scanner application 101 issues a scanning request to the control unit 103 to cause the scanner engine 107 to operate, thereby scanning an original.

The printer application 102 is an application for executing a printing process. Specifically, the printer application 102 issues a printing request to the control unit 103 to cause the printer engine 108 to operate.

Although only the scanner application 101 and the printer application 102 are illustrated in FIG. 1 as applications, the distribution managing system 1000 can have other applications such as a copy application for executing a copy process and a facsimile application for executing a facsimile reception and transmission process.

The managing server 200 is a computer such as a workstation that receives image data scanned by the MFP 100 and executes various processes or a distribution process in accordance with distribution definition data.

As shown in FIG. 1, the managing server 200 includes a remote communication unit 201, a processing unit 210, a flow execution control unit 203, a flow definition generating unit 204, a distribution definition generating unit 205, a flow definition data 206, and a distribution definition data 207.

The remote communication unit 201 receives image data and metadata from the MFP 100 and mediates communication of image data distributed by a distribution processing unit 212 to external devices such as the PC 400 and the printer 500.

The processing unit 210 executes various processes defined in the flow definition data 206, and includes an image processing unit 211 that executes an image process such as conversion of image data and the distribution processing unit 212 that distributes image data received in accordance with the distribution content defined in the distribution definition data 207 to the external devices.

When the distribution processing unit 212 receives the image data and the metadata from the MFP 100, the distribution processing unit 212 generates a distribution parameter for distributing the image data and the metadata to the external devices by referring to the distribution definition data 207. The image data, the metadata, and the distribution parameter are associated with one another in advance by an identification (ID) or the like, although not explained in detail.

The flow execution control unit 203 reads the flow definition data 206 from the HDD and controls execution of various processes defined in the flow definition data 206 by the processing unit 210.

The flow definition generating unit 204 generates or edits the flow definition data 206 in accordance with the instruction by an administrator such as a system administrator of the managing server 200, and stores the generated or edited flow definition data 206 in the HDD.

The distribution definition generating unit 205 generates or edits the distribution definition data 207 in accordance with the instruction by a system administrator, and stores the generated or edited distribution definition data 207 in the HDD.

The flow definition data 206 is data defining a flow of various processes to the image data that is input to the MFP 100 through scanning and is received from the MFP 100. The image data and the metadata received from the MFP 100 are executed by the flow execution control unit 203 in accordance with the flow of the process defined in the flow definition data 206 (e.g., the flow of a process as a contract document, a bill, or the like).

The distribution definition data 207 is data in which a destination, a storage area, and the like for distributing the image data received from the MFP 100 to the PC 400 are defined. The distribution processing unit 212 refers to the distribution definition data 207, and the image data is distributed in accordance with the definition.

The client device 300 includes an input receiving unit 310, a display unit 320, a screen definition generating unit 330, the screen definition data 340, and a remote communication unit 350.

The input receiving unit 310 includes an input device such as a keyboard and a mouse and receives from a user a setting instruction and an arrangement instruction of various items such as a text box, a radio button, and a pull-down button for inputting the metadata that constitute the metadata input screen. The setting and arrangement of the items can be performed by a drag-and-drop operation using a mouse or the like.

The display unit 320 includes a display such as a liquid crystal display (LCD) and a displays screen-definition-data generating screen.

The screen definition generating unit 330 displays the screen-definition-data generating screen on the display unit 320. A system administrator performs an input operation on the screen-definition-data generating screen, which is received by the screen definition generating unit 330 to generate the screen definition data 340.

The screen-definition-data generating screen can be edited using the graphical user interface (GUI), and the edited screen-definition-data generating screen is stored in the screen definition data 340 as an XML format file. The screen definition data 340 is data defining an input screen as displayed on the screen-definition-data generating screen. When the input screen is generated in accordance with the definition, the screen displayed at the time of editing is reproduced. That is, the screen-definition-data generating screen can be edited by a "what you see is what you get" (WYSIWYG) system.

The screen-definition-data generating screen can be edited using the GUI, so that it is possible to reduce a workload on a person generating a screen or managing the system such as a system administrator and customize the screen-definition-data generating screen freely.

Figure 3:
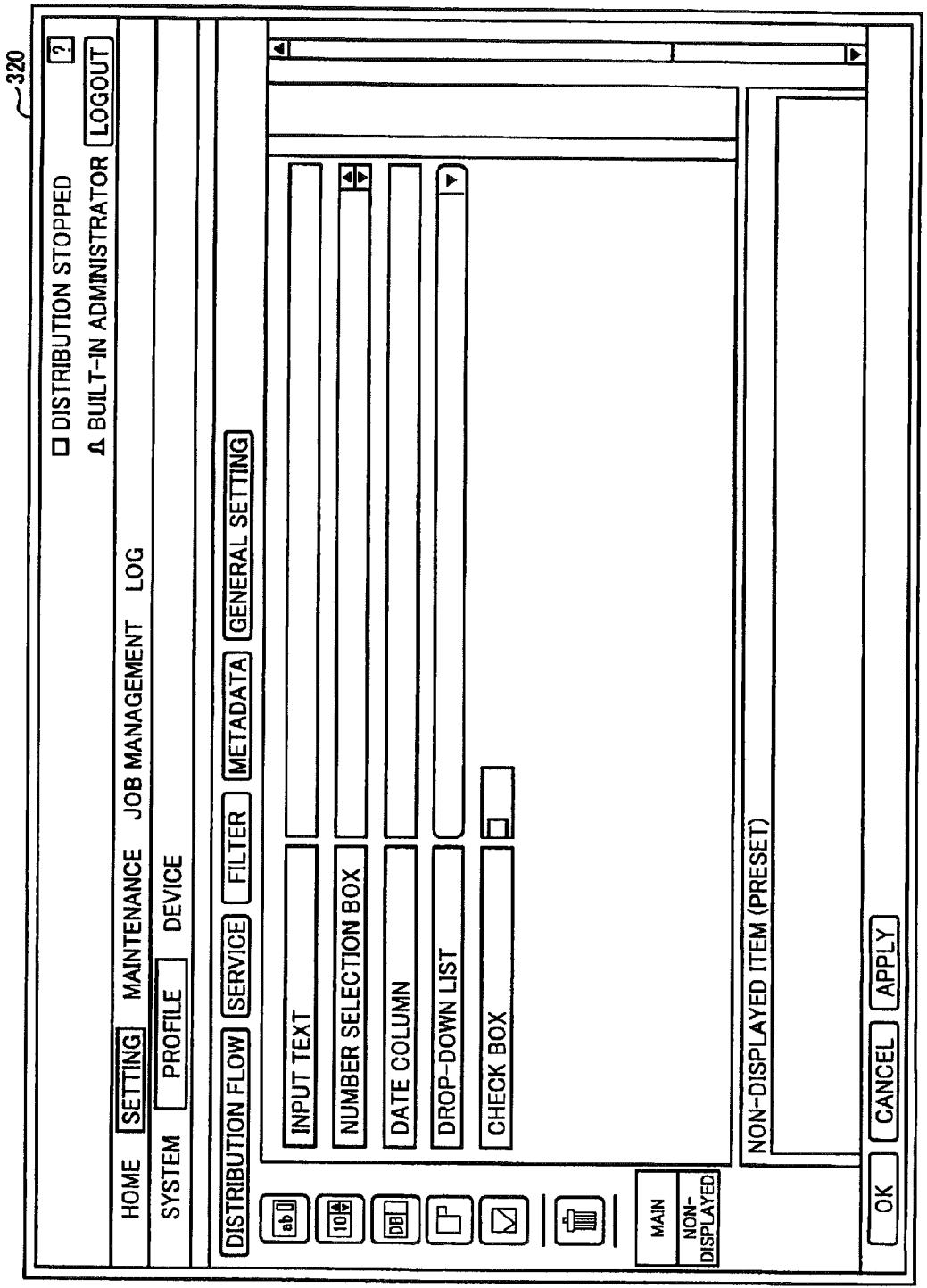
FIG. 3 is a schematic diagram illustrating an example of a screen-definition-data generating screen generated by a client device shown in FIG. 1 for generating the metadata input screen.

FIG. 3 is a schematic diagram illustrating an example of the screen-definition-data generating screen that can be displayed by a system administrator. As shown in FIG. 3, various items of the metadata such as a character string type item, a numerical value type item, a date type item, a drop-down type item, and a check box type item can be set.

A metadata input screen displayed on the operation panel 110 has a design similar to that generated on the screen-definition-data generating screen. However, it is possible to hide newly added items of the metadata on the display screen of the operation panel 110. In this case, a system administrator sets a fixed value on the items of the metadata.

Specifically, a metadata item can be dragged and dropped onto a "non-display" box in the left column in FIG. 3, or a position of a metadata item that is already set on the screen-definition-data generating screen can be arranged to a different position, by operating the input receiving unit 310. In this case, the screen definition data 340 including only the metadata item arranged to the different position can be generated to be merged with the already generated screen definition data 340.

A system administrator can determine an initial value for each metadata item on the screen-definition-data generating screen to be displayed on the operation panel 110. When each metadata item is double-clicked, the screen definition generating unit 330 displays an attribute setting dialog box on the display. Details of the metadata items can be set by inputting information in the attribute setting dialog boxes.

When a system administrator instructs execution on the screen-definition-data generating screen, the screen definition generating unit 330 obtains a setting content of the screen-definition-data generating screen and a setting content of the attribute setting dialog box. Then, the screen definition generating unit 330 merges the setting contents, defines tags that are a descriptor for the XML or the like, and converts the merged content into the XML format by utilizing the tags, thereby generating the screen definition data 340 in the XML format. In this manner, the metadata items are defined by tags of the XML, so that a user can freely expanded and define the items displayed on the input screen on the display unit 113 as explained in modified examples below.

The screen definition data 340 is definition data for displaying the metadata input screen in the XML format that is generated by the screen definition generating unit 330, and is stored in a storage medium such as an HDD and a memory.

The remote communication unit 350 transmits the screen definition data 340 generated by the screen definition generating unit 330 to the MFP 100.

The screen definition data 340 generated by the client device 300 is transmitted to the MFP 100 to be displayed on the operation panel 110. A user then inputs metadata through the operation panel 110, which is transmitted to the managing server 200. A specific example of the above operation is explained below by using a metadata input screen and a screen-definition-data generating screen simplified from those in FIGS. 2 and 3 for easy understanding.

FIG. 4 is a schematic diagram illustrating an example of the screen-definition-data generating screen displayed on the display unit 320. In the screen-definition-data generating screen in this example, an input box for inputting the name of a document to be a target for scanning is displayed as the metadata input screen.

When the screen-definition-data generating screen as shown in FIG. 4 is displayed, the screen definition generating unit 330 generates screen definition data in the XML format as shown in FIG. 5 and stores it in an HDD or a memory as the screen definition data 340. In the example shown in FIG. 5, an attribute of the item is defined as a text (type="text") on the screen-definition-data generating screen shown in FIG. 4.

Figures 6, 7, 8:
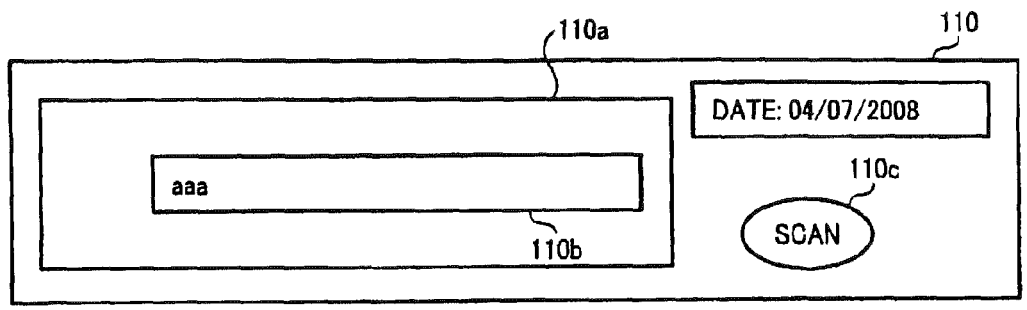
FIG. 6 is a schematic diagram illustrating an example of the metadata input screen displayed on the operation panel based on the screen definition data shown in FIG. 5.
FIG. 7 is a schematic diagram illustrating an example of a case where the metadata input from the MFP is generated as data in XML format.
FIG. 8 is a schematic diagram illustrating an example of a distribution parameter generated by a managing server shown in FIG. 1.

When the screen definition data 340 is generated by an administrator or the like, the generated screen definition data 340 is transmitted to the MFP 100 via the remote communication unit 350. When the input control unit 106 detects the execution of the scanning process by a user pressing the operation unit 112 or the like, the input control unit 106 causes the display control unit 105 to execute the screen definition data 340 to display the metadata input screen on the display unit 113 as shown in FIG. 6. In the example shown in FIG. 6, a user inputs the name "aaa" of a document to be a target for scanning in an input text box 110b displayed on a physical input area 110a on the operation panel 110. A scanning execution button 110c serves as the physical operating unit 112.

When the scanning process is performed by a user in the MFP 100, the remote communication unit 104 transmits to the managing server 200 the scanned image data and the data in the XML format as shown in FIG. 7 that is converted from the metadata input from the metadata input screen that is displayed based on the received screen definition data 340. In the example shown in FIG. 7, the document name "aaa" as the input metadata and the date "20080407" on which the document name is input are converted into the XML data.

Thereafter, when the managing server 200 receives the image data and the data converted into the XML format from the metadata, the distribution processing unit 212 reads the IP address of the PC 400 that is a distribution destination of the image data and the storage area by referring to the distribution definition data 207 as shown in FIG. 8 and distributes the image data. In the example shown in FIG. 8, the image data (a file "aaa" input in the input text box 110b in FIG. 6) is distributed to and stored in a folder "c:\target-folder" of the PC 400 of which IP address is "XXX.XXX.XXX.XXX".

Figure 9:
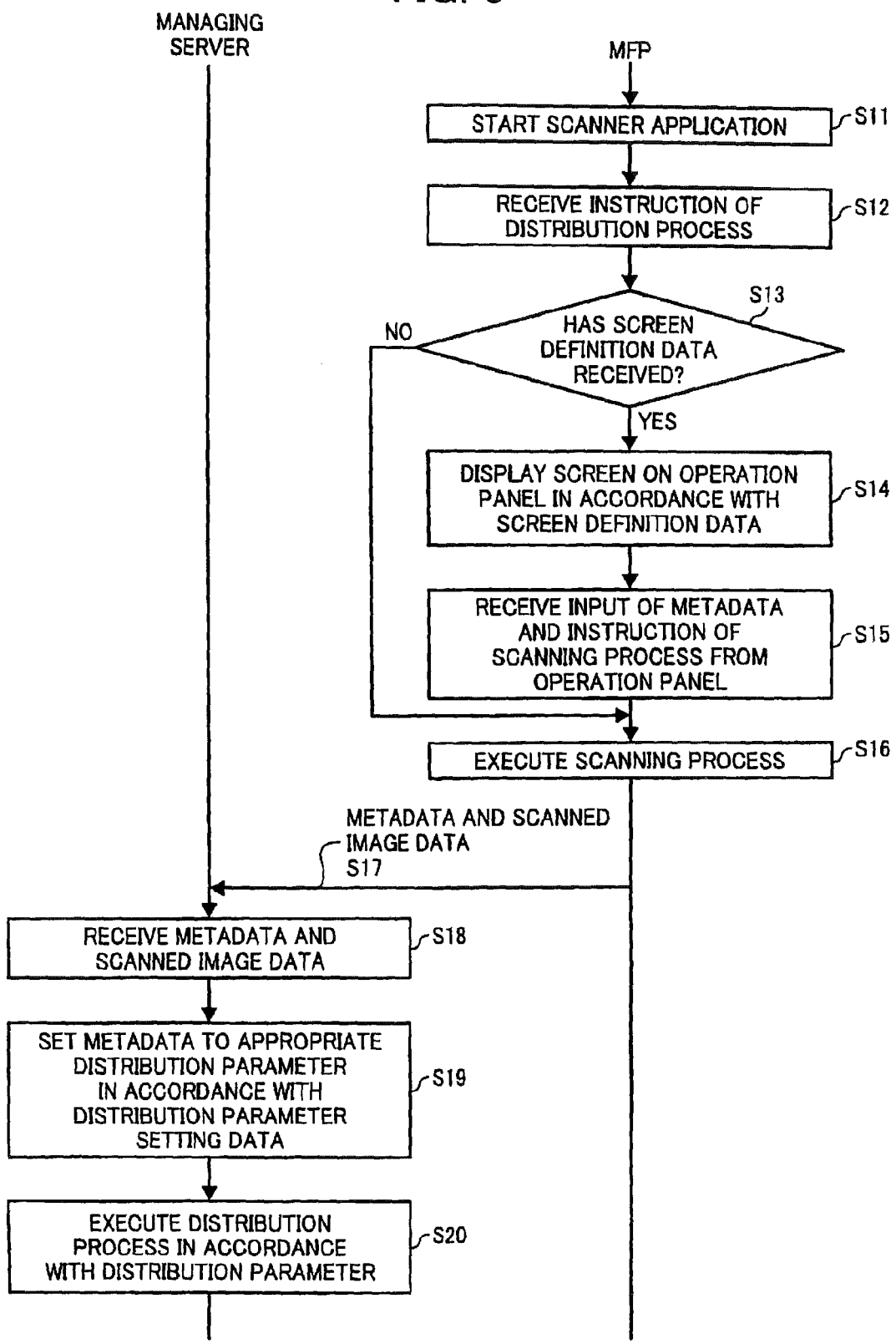
FIG. 9 is a sequence diagram of a distribution process by the distribution managing system.

An image data distribution process by a distribution managing system according to the embodiment configured as above is explained. FIG. 9 is a sequence diagram of the image data distribution process according to the embodiment. In the following explanation, the screen definition data on the metadata input screen to be displayed on the display unit 113 is transmitted in advance from the client device 300, and a user performs scanning to distribute the image data to an external device such as the PC 400.

When a user presses the scan button of the operation unit 112 of the operation panel 110, the scanner application 101 is started in response to the pressing of the scan button (Step S11), and the operation unit 112 receives an instruction of the image data distribution process (Step S12).

When the scanner application 101 is started, the display control unit 105 determines whether the remote communication unit 104 has received the screen definition data from the client device 300 (Step S13). If the display control unit 105 determines that the remote communication unit 104 has not received the screen definition data (No at Step S13), the scanning process is executed (Step S16).

If the display control unit 105 determines that the remote communication unit 104 has received the screen definition data (Yes at Step S13), the display control unit 105 executes the screen definition data to display the metadata input screen on the display unit 113 (Step S14), and the operation unit 112 receives input of the metadata (Step S15). Then, the scanning process is executed (Step S16).

Thereafter, the remote communication unit 104 transmits the scanned image data and the metadata to the managing server 200 (Step S17), and the remote communication unit 201 receives the image data and the metadata (Step S18).

The distribution processing unit 212 then generates the distribution parameter corresponding to the received image data and the metadata by referring to the distribution definition data 207 (Step S19), and distributes the received image data to the external device via the remote communication unit 201 in accordance with the distribute parameter (Step S20).

In the distribution managing system 1000 according to the embodiment, when the image data scanned by the MFP 100 is distributed to the managing server 200, the metadata for the image data can be freely set in the client device 300. Therefore, it is possible to reduce a workload on a user when distributing documents, so that convenience of the document distribution operation can be enhanced.

In the embodiment, the client device 300 generates the screen definition data 340 defining the metadata input screen; however, the screen definition generating unit 330 or the screen definition data 340 can be provided to the MFP 100, and a system administrator or the like can generate the screen definition data 340 for the metadata input screen by directly using the MFP 100.

In the embodiment, the file name of the image data that is scanned and distributed is input in text as the metadata; however, it is also possible to generate the screen definition data 340 so that various pieces of metadata can be set other than the file name. In the following modified examples, various pieces of metadata are generated to display various metadata input screens on the display unit 113 (i.e., items of the metadata are expanded and defined).

In the following modified examples, the process from generation of the screen definition data 340 in the client device 300 to distribution of the image data by the managing server 200 is the same as that in the above embodiment, so that only specific examples of the metadata input screen, the screen definition data, the screen-definition-data generating screen, and an attribute screen of the screen-definition-data generating screen are explained.

Figures 10, 11, 12, 13:
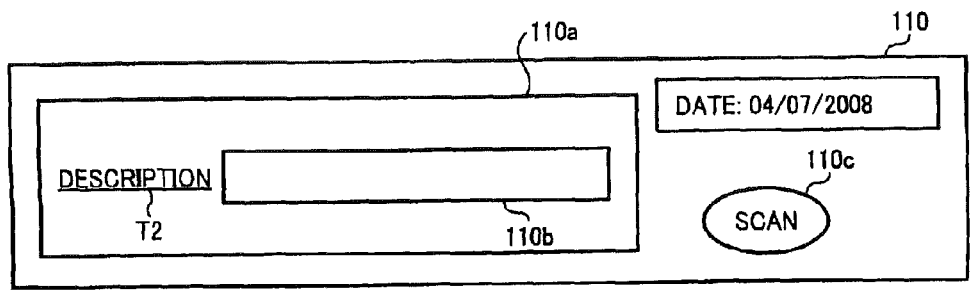
FIG. 10 is a schematic diagram illustrating an example of the screen definition data in XML format generated in a first modified example.
FIG. 11 is a schematic diagram illustrating an example of data in XML format on metadata generated in the first modified embodiment.
FIG. 12 is a schematic diagram illustrating an example of the screen definition data in XML format generated in a second modified example.
FIG. 13 is a schematic diagram illustrating an example of the metadata input screen displayed on a display unit of the MFP based on the screen definition data shown in FIG. 12.

In a first modified example, a tag can be freely set when the metadata such as a document name of image data as a distribution target is defined. FIG. 10 is a schematic diagram illustrating an example in which a tag name T1 of a text box for inputting a file name of image data as a distribution target is set to "myDocumentTitle" in the screen definition generating unit 330.

The metadata input screen is displayed on the display unit 113 in accordance with the screen definition data shown in FIG. 10, and thereafter, the metadata input from the metadata input screen is converted into data in the XML format. In the example shown in FIG. 11, a file name of the image data to be distributed is input as the metadata in the same manner as the above embodiment.

A tag representing an item of the metadata input on the metadata input screen can be freely set. Therefore, various processes in the MFP 100, the managing server 200, the external device, or other external systems can be freely cooperated with one another depending upon the set tag name such as executing a distribution process by the distribution processing unit 212 with the set tag name (e.g., the tag T1 "myDocumentTitle" shown in FIG. 11) as a trigger or storing only files that are specified with the set tag name (e.g., "myDocumentTitle") in the external device such as the PC 400 or other external systems.

In a second modified example, a title of a text box for inputting the metadata such as a document name of image data as a distribution target is defined. FIG. 12 is a schematic diagram illustrating an example in which a tag name T2 for displaying a title of a text box for inputting a file name of image data as a distribution target is set to "displayName" in the screen definition generating unit 330. The metadata input screen as shown in FIG. 13 is displayed on the display unit 113 in accordance with the definition shown in FIG. 12.

Figure 14:
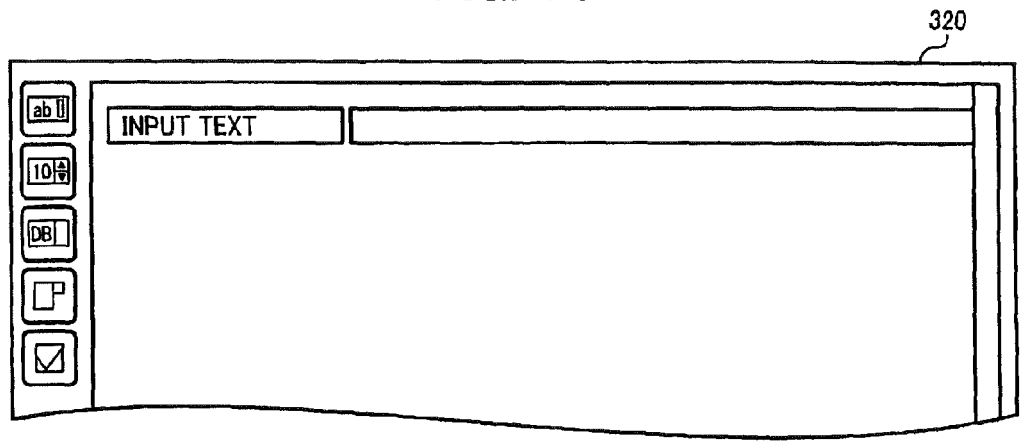
FIG. 14 is a schematic diagram illustrating an example of the screen-definition-data generating screen for generating the screen definition data shown in FIG. 12.

Specifically, as shown in FIG. 14, a text box for inputting a document file name and a text box (a box represented as "input text" in FIG. 14) for giving a title to the generated text box are generated by a system administrator operating the input receiving unit 310 on the screen-definition-data generating screen displayed on the display unit 320 or the like.

Figure 15:
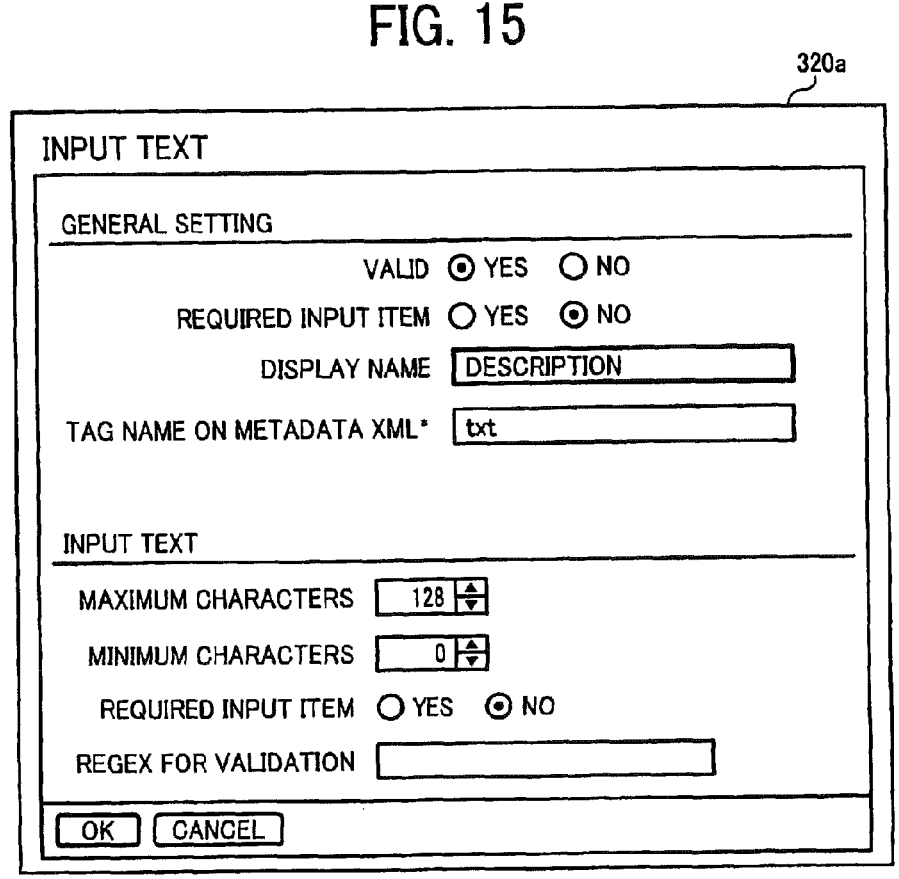
FIG. 15 is a schematic diagram illustrating an example of an attribute display screen of the screen-definition-data generating screen shown in FIG. 14.

Then, an attribute display screen 320a of the text box as shown in FIG. 15 is displayed by right-clicking the input receiving unit 310 or the like, and a title of the text box for giving a title is set. In the example shown in FIG. 15, a title name "description" is set in the attribute "display name". The title name set in this manner is displayed as a title "description" (T2) on the display unit 113 as shown in FIG. 16.

Accordingly, a title display of a document file name of image data to be distributed can be freely defined, so that incorrect input or input error of a document file name by a user can be reduced.

Figure 18:
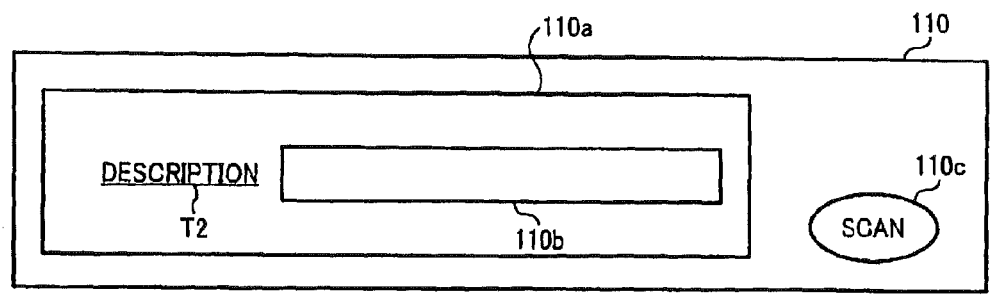
FIG. 18 is a schematic diagram illustrating an example of the metadata input screen (in English) displayed on the display unit based on the screen definition data shown in FIG. 17.

In a third modified example, terms such as a title and the like are defined to be displayed in multiple languages when the metadata such as a document name of image data as a distribution target is input. FIG. 17 is a schematic diagram illustrating an example in which a tag T3 set to "Japanese" for displaying the metadata input screen in Japanese is added to the tag T2 in the screen definition generating unit 330 so that the metadata input screen can be displayed in any of Japanese and English. A display screen in English as shown in FIG. 18 and a display screen in Japanese as shown in FIG. 19 can be displayed on the display unit 113 as the metadata input screen in accordance with the definition shown in FIG. 17.

Figure 20:
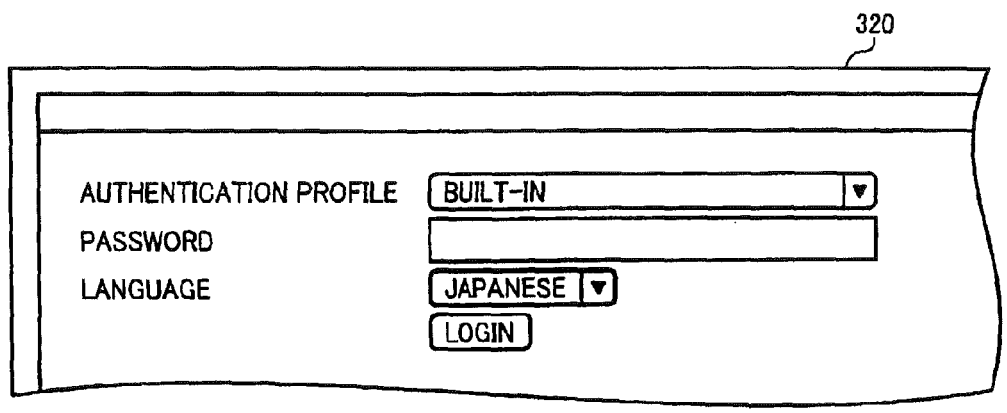
FIG. 20 is a schematic diagram illustrating an example of the screen-definition-data generating screen for generating the metadata input screen shown in FIG. 19.
Figure 21:
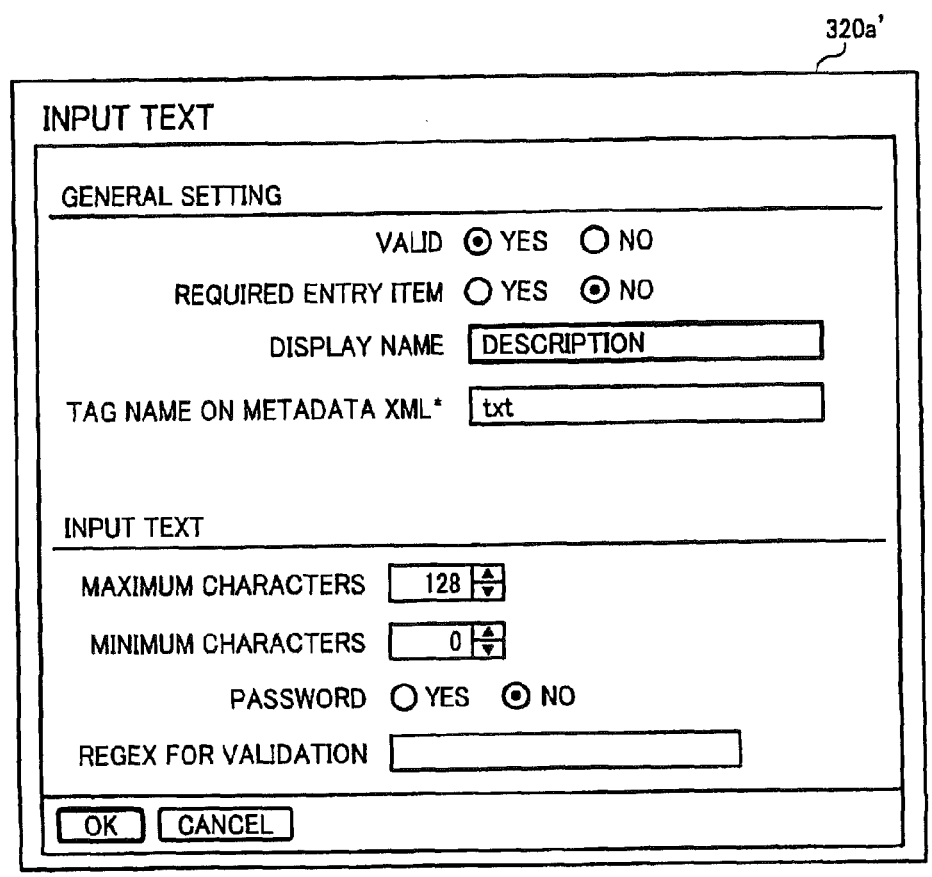
FIG. 21 is a schematic diagram illustrating an example of the attribute display screen (before change) of the screen-definition-data generating screen shown in FIG. 19.

Specifically, when the screen-definition-data generating screen is displayed by a system administrator or the like with the screen definition generating unit 330, an attribute display screen 320a' of an item such as an input text box or the like set in the screen-definition-data generating screen is displayed by logging in the client device 300 in Japanese mode in advance as shown in FIG. 20, and "description" (in English) written in "display name" as shown in FIG. 21 is changed into "description" (in Japanese) as shown in FIG. 22 to generate the screen definition data for Japanese. The metadata input screen for Japanese as shown in FIG. 23 is displayed on the display unit 113 in accordance with the screen definition data 340 generated in such a manner.

Accordingly, various users can input metadata by defining tags so that the metadata input screen can be displayed in multiple languages.

Figure 19:
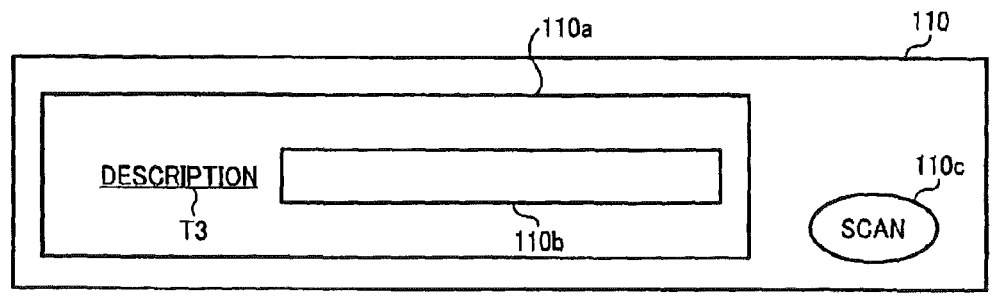
FIG. 19 is a schematic diagram illustrating an example of the metadata input screen (in Japanese) displayed on the display unit based on the screen definition data shown in FIG. 17.

In FIGS. 17 to 23, all terms are written in English; however, in reality, the term "description" in the tag T3 in FIG. 17 and in FIG. 19 is written in Japanese, and all terms in FIGS. 20 to 23 are written in Japanese except the term "description" written in "display name" in FIG. 21 and the terms "system condition" and "job list" in FIG. 23.

In a fourth modified example, an input value of the metadata such as a document name of image data as a distribution target is defined to be displayed as a default value in advance. FIG. 24 is a schematic diagram illustrating an example in which a tag T4 for displaying a company name on the metadata input screen as "XYZ Corporation" in advance is set to "value". A display screen on which a company name is set to "XYZ Corporation" as shown in FIG. 25 can be displayed in advance on the display unit 113 as the metadata input screen in accordance with the definition shown in FIG. 24.

Specifically, when a screen-definition-data generating screen is displayed by a system administrator or the like with the screen definition generating unit 330, "XYZ Corporation" is input to a text input box in advance as shown in FIG. 26 and an initial value is set on the attribute display screen 320a shown in FIG. 15 or the like, so that the metadata input screen with the default value of "XYZ Corporation" as shown in FIG. 27 is displayed on the display unit 113. Although an example of the screen definition data is not shown, it is generated in the same manner as the above modified examples.

Accordingly, metadata to be input to a metadata input screen is displayed in advance, so that a user does not need to input the metadata, thereby enhancing convenience for a user at the time of performing scanning or the like.

In a fifth modified example, an input value of the metadata such as a document name of image data as a distribution target is defined so that it can be selected from among a plurality of predetermined values and specified. FIG. 28 is a schematic diagram illustrating an example in which a tag T5 is set to "select" and tags T5a, T5b, and T5c for document names of "requirement definition", "basic design", and "detail design" are set to "option" in the screen definition generating unit 330 so that "requirement definition", "basic design", and "detail design" are displayed as the document names of image data as a distribution target and a user can select a document name from among the displayed document names.

Figure 29:
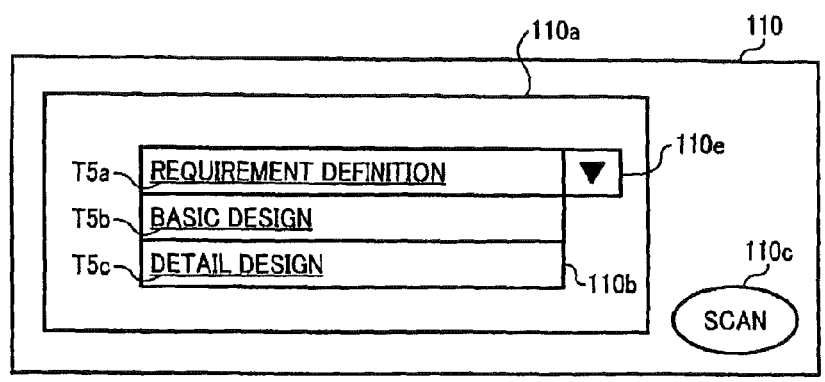
FIG. 29 is a schematic diagram illustrating an example of the metadata input screen displayed on the display unit based on the screen definition data shown in FIG. 28.

A pull-down display screen as shown in FIG. 29 can be displayed on the display unit 113 in accordance with the definition shown in FIG. 28.

Figure 30:
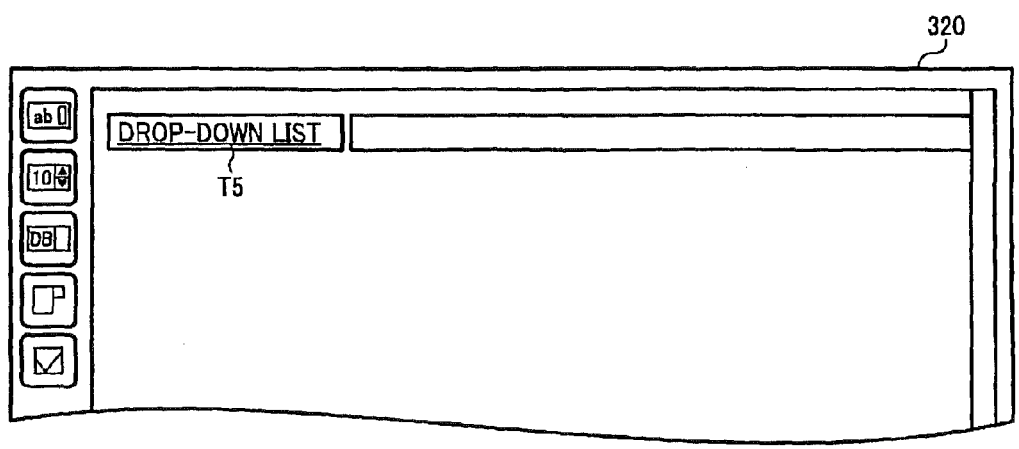
FIG. 30 is a schematic diagram illustrating a specific example of the screen-definition-data generating screen for generating the metadata input screen shown in FIG. 29.
Figure 31:
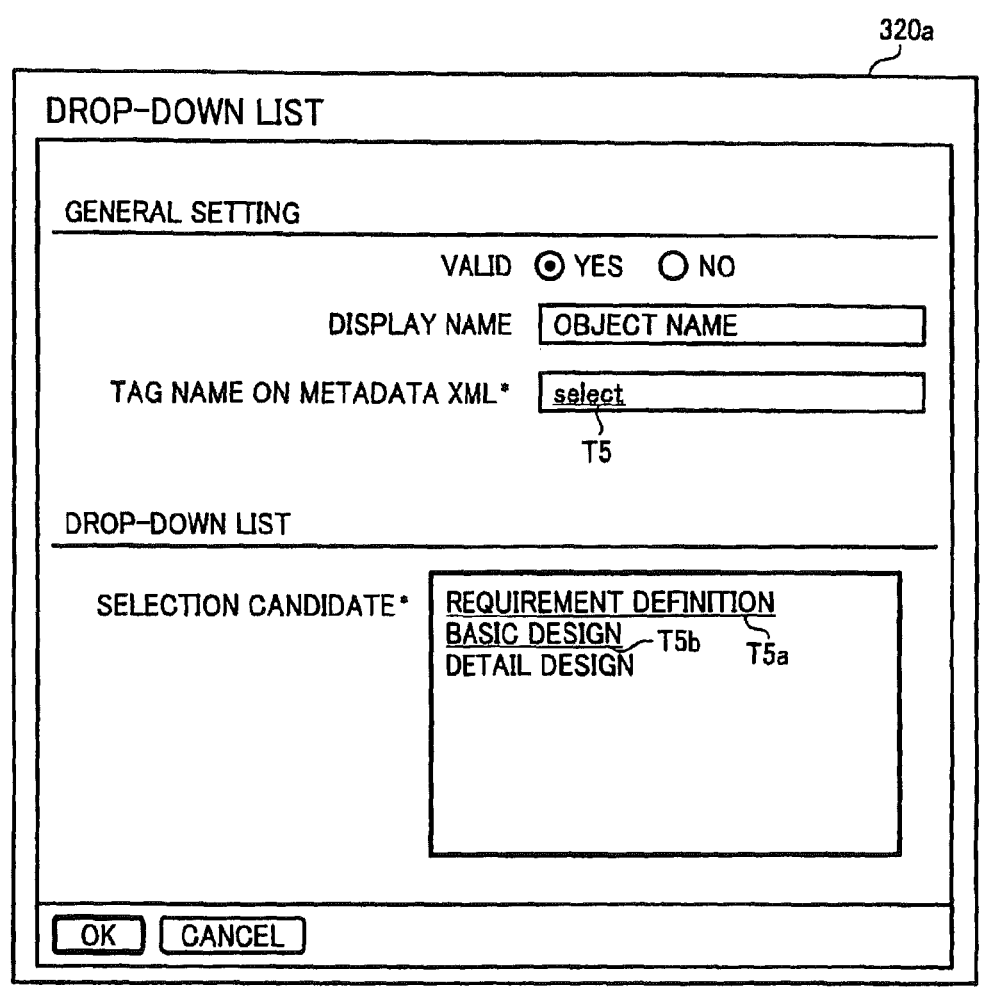
FIG. 31 is a schematic diagram illustrating an example of the attribute display screen of the screen-definition-data generating screen shown in FIG. 30.

Specifically, when a screen-definition-data generating screen is displayed by a system administrator or the like with the screen definition generating unit 330, a drop-down list is set as an item for inputting the metadata as shown in FIG. 30, and "select" is set in a tag name column on the metadata XML and the file names of "requirement definition", "basic design", and "detail design" are set by inputting them in a selection candidate column as the document file names to be selected in the attribute display screen 320a.

The pull-down list and a plurality of document names are set in this manner. Therefore, the pull-down list as shown in FIG. 32 is displayed on the display unit 113, and a menu screen in which a user can select a document name from among a plurality of file names is displayed in accordance with a selection operation by a user as shown in FIG. 33.

Accordingly, it is possible to simplify an operation of inputting metadata such as a document name of image data by a user at the time of performing scanning or the like by displaying a pull-down list on a metadata input screen, thereby enhancing convenience for a user.

Figures 34, 35:
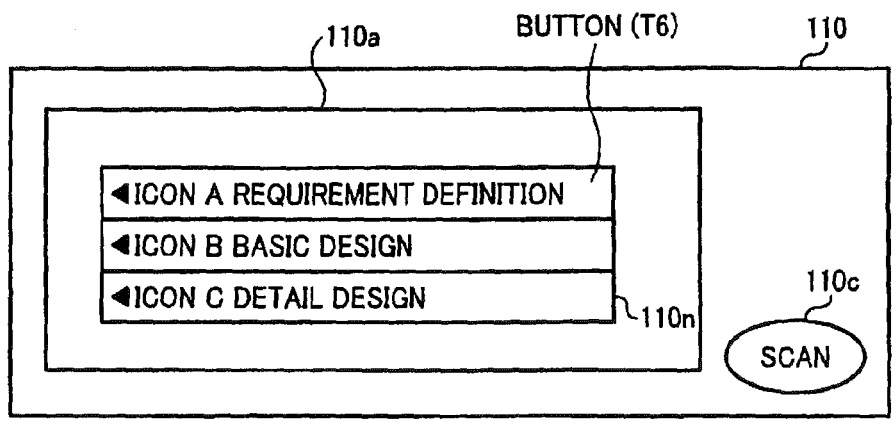
FIG. 34 is a schematic diagram illustrating an example of the screen definition data in XML format generated in a sixth modified example.
FIG. 35 is a schematic diagram illustrating an example of the metadata input screen displayed on the display unit based on the screen definition data shown in FIG. 34.

In a sixth modified example, icons are defined to be displayed on the pull-down list in the fifth modified example. FIG. 34 is a schematic diagram illustrating an example in which a tag T6 for defining display of the icons is set to "radio" and tags T6a, T6b, and T6c for displaying the icons of a plurality of document files are set to "icon" in the screen definition generating unit 330 in addition to the definition of "option" for defining a plurality of document names as shown in FIG. 28. The icons are stored in a storage medium (not shown) such as an HDD and a memory of the client device 300 in advance.

A pull-down display screen with icons as shown in FIG. 35 can be displayed on the display unit 113 in accordance with the definition shown in FIG. 34. A user can select a document file name by touching an icon displayed on the display unit 113 or the like. In this case, a color of a selected document file name can be reversed for improving visibility.

Accordingly, a pull-down list with icons is displayed on a metadata input screen, so that a user can recognize metadata such as a document name to be input at a glance and an input operation by a user can be further simplified, thereby further enhancing convenience for a user.

Figures 36, 37:
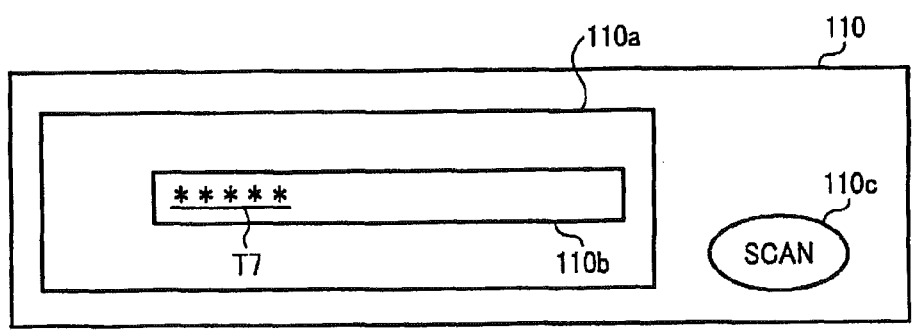
FIG. 36 is a schematic diagram illustrating an example of the screen definition data in XML format generated in a seventh modified example.
FIG. 37 is a schematic diagram illustrating an example of the metadata input screen displayed on the display unit based on the screen definition data shown in FIG. 36.
Figure 38:
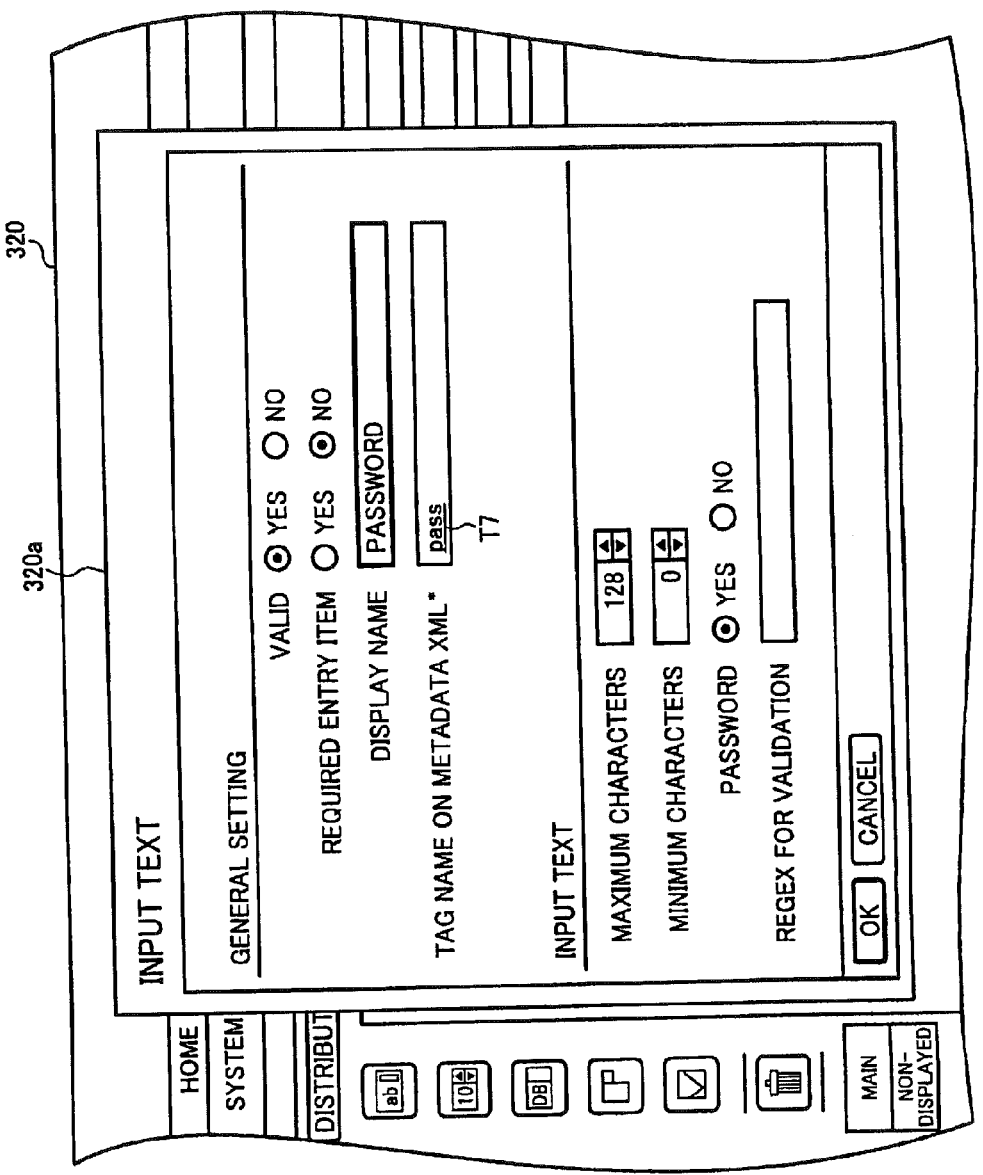
FIG. 38 is a schematic diagram illustrating an example of the attribute display screen of the screen-definition-data generating screen for generating the metadata input screen shown in FIG. 37.

In a seventh modified example, a hidden code such as * (asterisk) and # (sharp) or a hidden character is defined so that an input value is displayed with the hidden code or the hidden character when the metadata such as a document name of image data as a distribution target is input. FIG. 36 is a schematic diagram illustrating an example in which a tag T7 for making the input value into a hidden code or a hidden character when a document name of image data as a distribution target is input is set to "password" in the screen definition generating unit 330. As shown in FIG. 37, a character string or the like input by a user is converted into the hidden code or the hidden character to be displayed in an input column of the metadata input screen.

Specifically, when a screen-definition-data generating screen is displayed by a system administrator or the like with the screen definition generating unit 330, "pass" is set in a tag name column on the metadata XML in the attribute display screen 320a such as a text box for inputting the metadata, whereby the hidden code or the hidden character is displayed in the input column of the metadata input screen as shown in FIG. 39.

Accordingly, an input character string or the like is displayed with a hidden code or a hidden character, so that it is possible to prevent an unauthorized person to spy out metadata or reduce the risk of leakage of a password. Therefore, image data can be securely distributed, thereby enhancing security in the image data distribution process.

In an eighth modified example, an input value of the metadata input from the metadata input screen is defined so that it is possible to check whether the input value coincides with a character string or the like expressed in a predetermined regular expression. FIG. 40 is a schematic diagram illustrating an example in which a tag T8 is set to "check" for enabling to check whether a character string or the like is expressed in the regular expression and a character string to be checked is set to "*specification" in the screen definition generating unit 330. That is, when a character string that does not coincide with the regular expression "specification" is input, an error message is displayed on the display unit 113.

When the input control unit 106 receives the input value of the metadata input from the metadata input screen and converts it into the data in the XML format, it is determined whether a character string coincides with the regular expression character string and the error message is displayed if needed. When it is determined that the input character string does not coincide with the regular expression character string, the input control unit 106 instructs the display control unit 105 to display the error message on the display unit 113. Only when the input character string coincides with the regular expression character string, the distribution process by the remote communication unit 104 or the like is executed.

Figure 41:
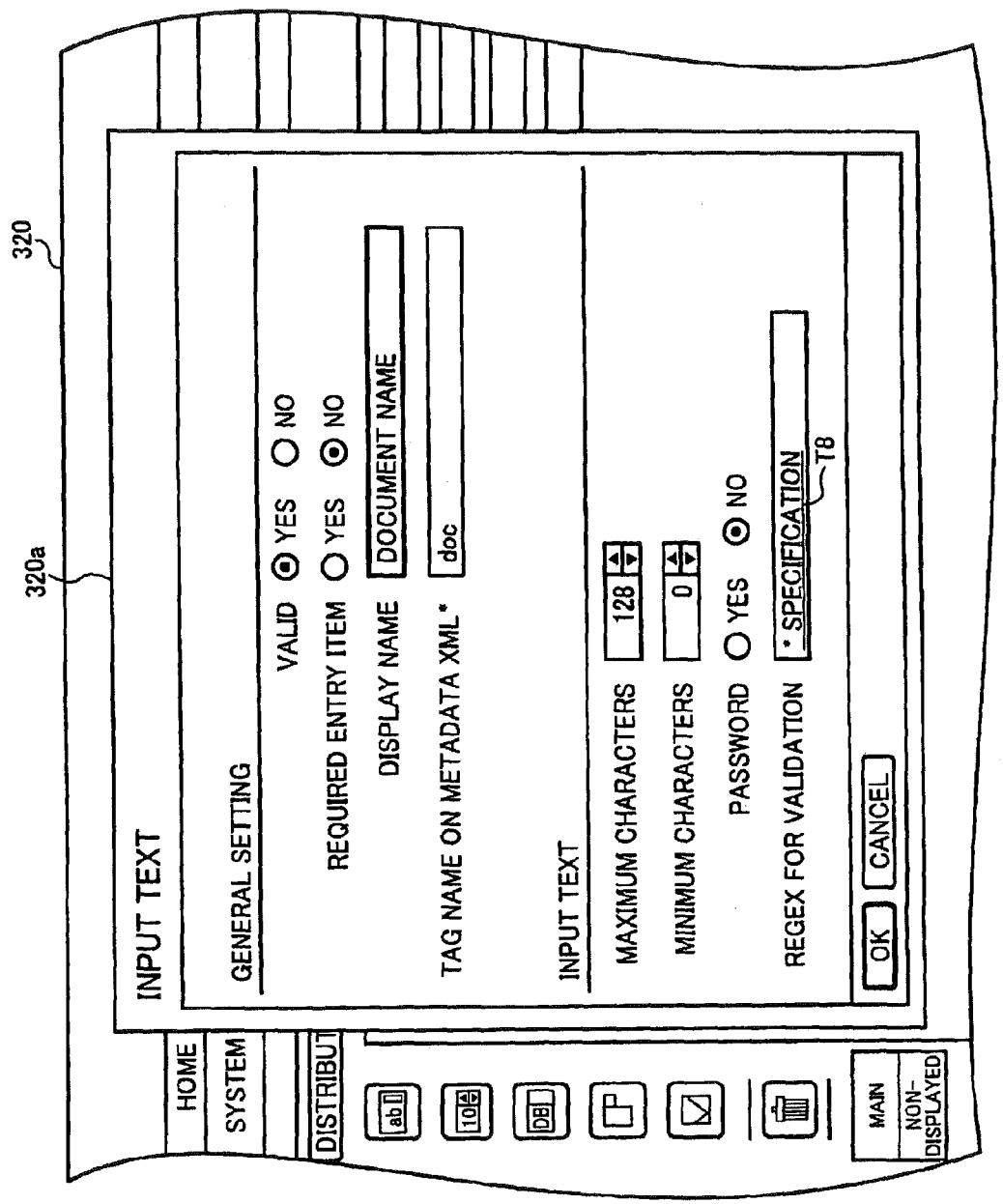
FIG. 41 is a schematic diagram illustrating an example of the attribute display screen of the screen-definition-data generating screen for generating the screen definition data shown in FIG. 40.

Specifically, when a screen-definition-data generating screen is displayed by a system administrator or the like with the screen definition generating unit 330, "specification" that is the regular expression character string for validation is set in a regular expression column for validation in the attribute display screen 320*a* such as a text box for inputting the metadata as shown in FIG. 41, whereby the input control unit 106 checks whether the input character string coincides with the regular expression character string.

Figure 42:
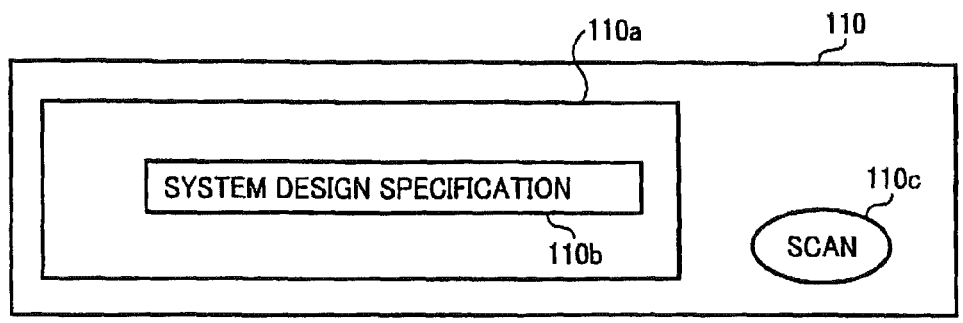
FIG. 42 is a schematic diagram illustrating an example of a case where a regular expression character string is input to the metadata input screen displayed on the display unit based on a definition set on the attribute display screen shown in FIG. 41.
Figure 43:
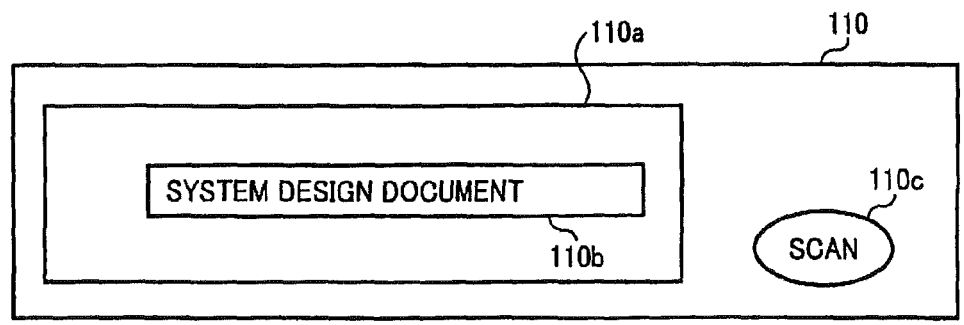
FIG. 43 is a schematic diagram illustrating an example of a case where a character string other than the regular expression character string is input to the metadata input screen displayed on the display unit based on the definition set on the attribute display screen shown in FIG. 41.
Figure 44:
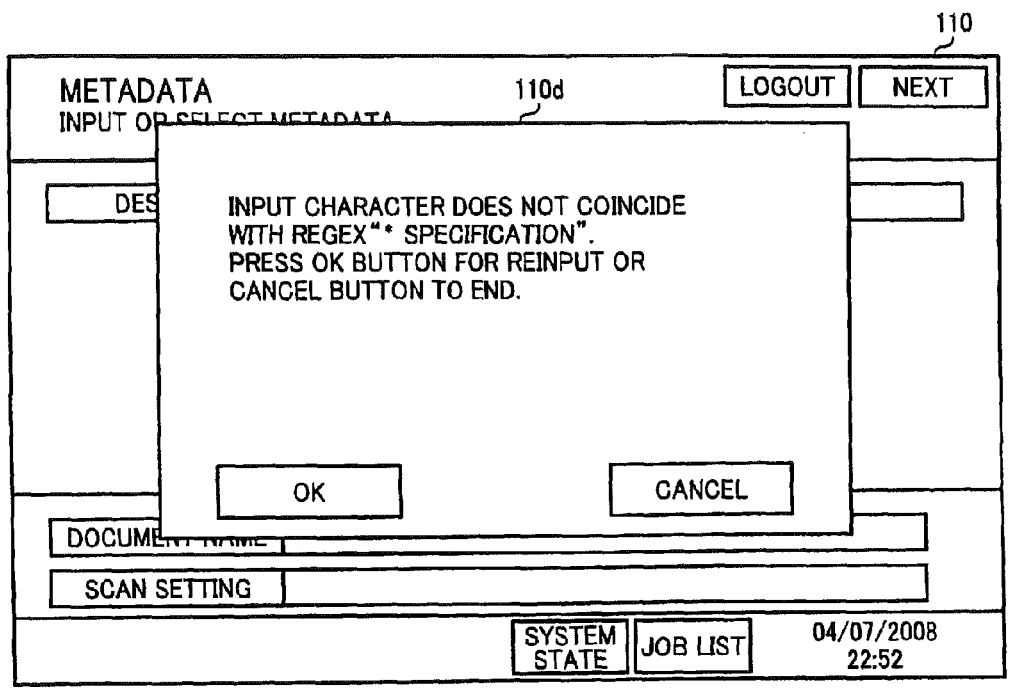
FIG. 44 is a schematic diagram illustrating an example of a screen displaying an error message in a case where a character string other than the regular expression character string is input to the metadata input screen shown in FIG. 43.
Figure 45:
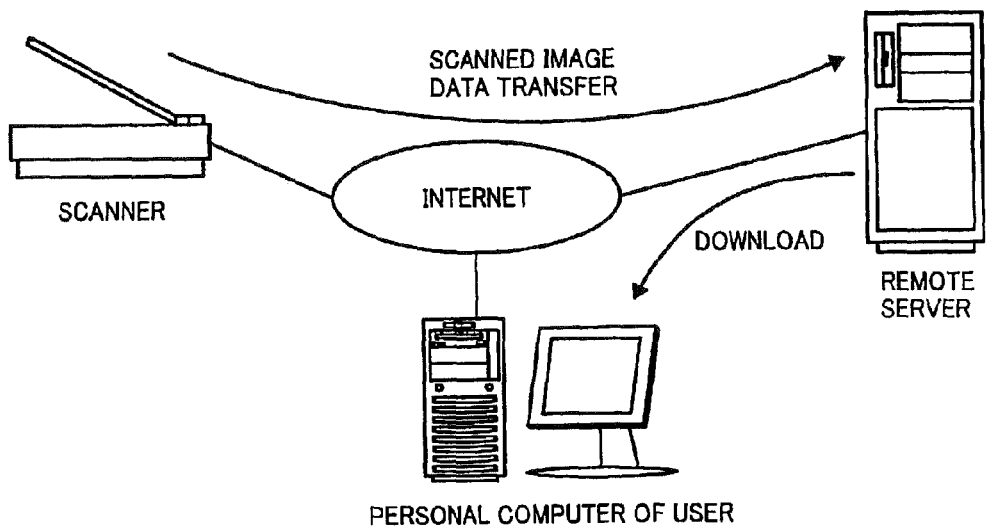
FIG. 45 is a schematic diagram for explaining a concept of a conventional distribution system.
Figure 46:
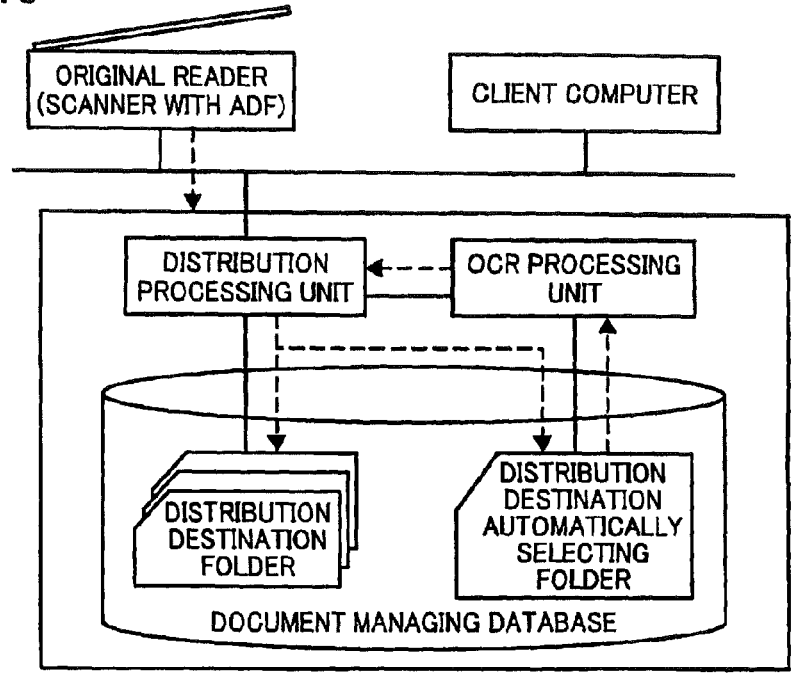
FIG. 46 is a schematic diagram for explaining a concept of a conventional document managing system.
Figure 47:
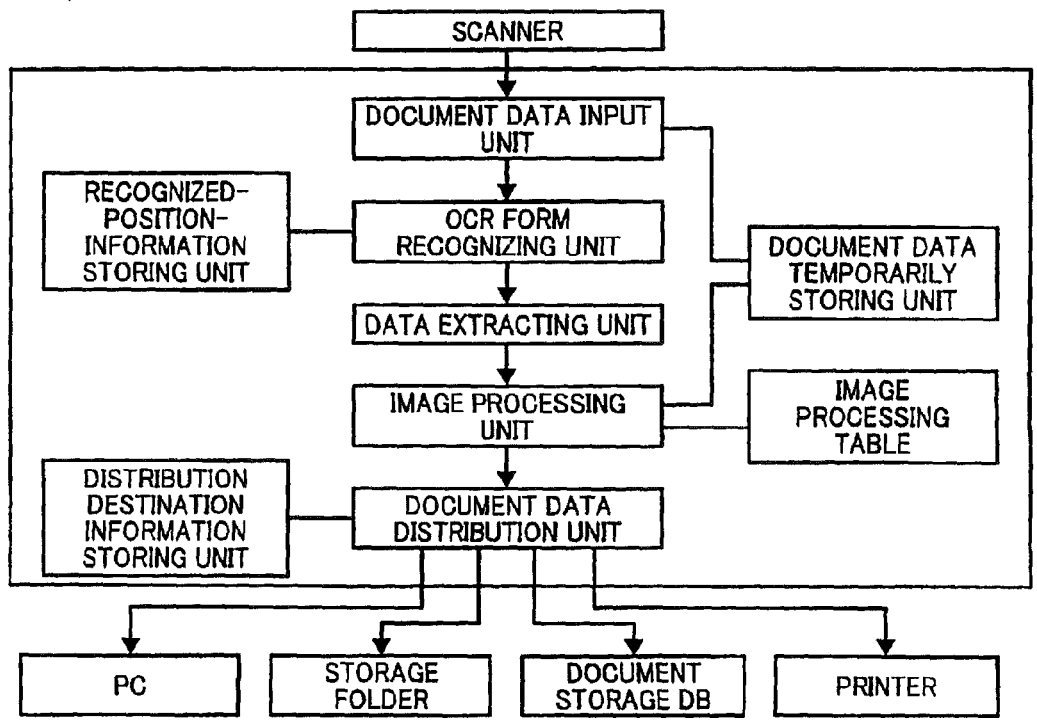
FIG. 47 is a schematic diagram for explaining a concept of a conventional document distribution processing apparatus.

In other words, as shown in FIG. 42, when a user inputs "system design specification" as the metadata, the condition of "*specification" that is the regular expression character string is satisfied. Therefore, the input control unit 106 determines that the character string satisfies the condition of the regular expression character string. On the other hand, as shown in FIG. 43, when a user inputs "system design document" as the metadata, the input control unit 106 instructs the display control unit 105 to display an error message screen 110*d* as shown in FIG. 44 on the display unit 113.

Accordingly, the distribution process is executed only when the character string input as the metadata coincides with the character string expressed in the regular expression, so that it is possible to reduce the risk of executing the distribution process based on a document file name or the like that is input incorrectly, enabling to execute the distribution process of the image data or the like more properly.

Computer programs executed by the MFP 100, the managing server 200, and the client device 300 are preinstalled in a read-only memory (ROM) or the like and are provided. The computer programs can be provided by recording them in a computer-readable recording medium such as a compact disk read only memory (CD-ROM), a flexible disk (FD), a compact disk recordable (CD-R), a digital versatile disk (DVD), or the like as a file in an installable format or an executable format.

Furthermore, the computer programs can be provided by storing them in a computer connected to a network such as the Internet and downloading them via the network. Moreover, the computer programs can be provided or distributed via the network such as the Internet.

The computer programs have a module structure that includes the above described units (the remote communication unit, the display control unit, the input control unit, the distribution processing unit, the screen definition generating unit, and the like). As an actual hardware, each of the above units is loaded and generated on a main memory by a central processing unit (CPU) reading the computer programs from the ROM and executing them.

In the above embodiments, the present invention is applied to an MFP as an example; however, the present invention can be applied to various apparatuses such as a copier, a facsimile, and a printer.

According to one aspect of the present invention, metadata of image data can be freely set.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A management server comprising:
an input/output (I/O) device configured to communicate with an image forming apparatus and one or more client devices; and
a memory configured to store a distribution definition data therein;
a processor configured to,
receive image data and metadata from the image forming apparatus, in response to a user entering the metadata through an input screen displayed on a display of the image forming apparatus and scanning a document associated with the metadata to generate the image data,
read the distribution setting parameter from the memory,
determine which of the one or more client devices is an output client device based on the metadata and the distribution definition data, and
distribute the image data to the output client device.

2. The management server of claim 1, wherein the processor is configured to transmit, via the I/O device, screen definition data to the image forming apparatus, if the management server has the screen definition data associated with the image forming device stored therein, the screen definition data limiting a number of settings associated with the image forming apparatus that are configurable by the user.

3. The management server of claim 2, wherein the settings each have an attribute associated therewith, the attribute indicating a data type that is allowable as an input value of respective ones of the settings.

4. The management server of claim 2, wherein, if the management server does not have the screen definition data associated with the image forming device stored therein, the processor is configured to receive the image data from the image forming apparatus without the metadata in response to the user scanning a document associated with the metadata to generate the image data using un-configurable default settings.

5. The management server of claim 2, wherein the processor is configured to distribute the image data to an internet protocol (IP) address associated with the output client device.

6. The management server of claim 2, wherein the metadata is in an Extensible Markup Language (XML).

7. A distribution management system comprising:
an image forming apparatus configured to including a scanner engine configured to generate image data from an input document;
one or more client devices configured to perform post-processing on the image data; and a management server including,
   a memory configured to store a distribution definition data therein;
   a processor configured to,
      receive the image data and metadata from the image forming apparatus, in response to a user entering the metadata through an input screen displayed on a display of the image forming apparatus and scanning a document associated with the metadata to generate the image data,
      read the distribution setting parameter from the memory,
      determine which of the one or more client devices is an output client device based on the metadata and the distribution definition data, and
      distribute the image data to the output client device.

8. The distribution management system of claim 7, wherein the management server is configured to transmit, via the I/O device, screen definition data to the image forming apparatus, if the management server has the screen definition data associated with the image forming device stored therein, the screen definition data limiting a number of settings associated with the image forming apparatus that are configurable by the user.

9. The distribution management system of claim 7, wherein the settings each have an attribute associated therewith, the attribute indicating a data type that is allowable as an input value of respective ones of the settings.

10. The distribution management system of claim 9, wherein the attribute is at least one of a character string type item, a numerical value type item, a date type item, a drop-down type item, or a check box type item.

11. The distribution management system of claim 10, wherein the image forming apparatus is configured to display a default value of the attribute, if the attribute is the character string type item and the metadata is set.

12. The distribution management system of claim 10, wherein the image forming apparatus is configured to display selection candidates of the metadata as a list, if the attribute is the drop-down type item and the selection candidates of the input value of metadata are set.

13. The distribution management system of claim 12, wherein the image forming apparatus is configured to display the selection candidates and icons in associated with respective ones of the selection candidates as the list, if the icons are set.

14. The distribution management system of claim 10, wherein the image forming apparatus is configured to display an input character string with a hidden code or a hidden character, if the attribute is the character string type item and hiding the display of the character string input is set.

15. The distribution management system of claim 7, wherein the management server is configured to distribute the image data to an internet protocol (IP) address associated with the output client device.

16. The distribution management system of claim 7, wherein the metadata is in an Extensible Markup Language (XML).

* * * * *